US008108130B2

(12) United States Patent
Scheuerer

(10) Patent No.: US 8,108,130 B2
(45) Date of Patent: Jan. 31, 2012

(54) METHOD FOR CALIBRATING A LAMBDA SENSOR AND INTERNAL COMBUSTION ENGINE

(75) Inventor: Johannes Scheuerer, Taufkirchen/Vils (DE)

(73) Assignee: Continental Automotive GmbH, Hannover (DE)

( * ) Notice: Subject to any disclaimer, the term of this patent is extended or adjusted under 35 U.S.C. 154(b) by 187 days.

(21) Appl. No.: 12/518,604

(22) PCT Filed: Oct. 31, 2007

(86) PCT No.: PCT/EP2007/061779

§ 371 (c)(1),
(2), (4) Date: Feb. 15, 2010

(87) PCT Pub. No.: WO2008/071500

PCT Pub. Date: Jun. 19, 2008

(65) Prior Publication Data

US 2010/0139245 A1 Jun. 10, 2010

(30) Foreign Application Priority Data

Dec. 13, 2006 (DE) ......................... 10 2006 058 880

(51) Int. Cl.
*F02D 41/14* (2006.01)
*G01M 15/10* (2006.01)

(52) U.S. Cl. ........ 701/109; 123/689; 123/693; 123/320; 123/325; 123/678; 73/1.07; 73/114.73

(58) Field of Classification Search .................. 701/109; 123/678, 689, 693, 320, 325; 73/1.07, 114.73
See application file for complete search history.

(56) References Cited

U.S. PATENT DOCUMENTS 4,909,223 A 3/1990 Ituzi et al.
5,658,445 A 8/1997 Hafele et al.
5,771,687 A 6/1998 Staufenberg et al.
6,116,228 A * 9/2000 Motose et al. ................ 123/679
6,279,372 B1 8/2001 Zhang
6,789,533 B1 9/2004 Hashimoto et al.
6,820,461 B2 11/2004 Sarholz et al.
2002/0003831 A1 1/2002 Hashimoto
2004/0060550 A1 4/2004 Wu et al.

(Continued)

FOREIGN PATENT DOCUMENTS

DE 3830574 A1 3/1989

(Continued)

OTHER PUBLICATIONS

German Office Action, German Application No. 10 2006 058 880.0-26, 4 pages, Jun. 5, 2007.

(Continued)

*Primary Examiner* — Erick Solis
(74) *Attorney, Agent, or Firm* — King & Spalding L.L.P.

(57) ABSTRACT

In the calibration of a lambda sensor (26), inaccuracies occur during a fuel cut-off overrun phase depending on the temperature. A method is proposed for correcting an output signal of a lambda sensor (16) of an internal combustion engine (1), having the following steps: detection of a fuel cut-off overrun phase of the internal combustion engine (1), sensing of an exhaust-gas composition by the lambda sensor (16) during the fuel cut-off overrun phase, sensing of a temperature which represents a measure of the intake air of the internal combustion engine (1), calibration of the lambda sensor (16) based on the second temperature.

15 Claims, 2 Drawing Sheets

U.S. PATENT DOCUMENTS

| | | | | |
|---|---|---|---|---|
| 2005/0247288 | A1* | 11/2005 | May | 123/344 |
| 2009/0095049 | A1 | 4/2009 | Graupner et al. | |
| 2009/0118988 | A1* | 5/2009 | Moening et al. | 701/109 |

FOREIGN PATENT DOCUMENTS

| | | | |
|---|---|---|---|
| DE | 19545706 | A1 | 6/1997 |
| DE | 19842425 | A1 | 3/2000 |
| DE | 10043690 | A1 | 3/2002 |
| DE | 102006011722 | B3 | 12/2007 |
| EP | 0779426 | A2 | 6/1997 |
| EP | 1048834 | A2 | 11/2000 |
| EP | 1333171 | A1 | 8/2003 |
| EP | 1588875 | A1 | 10/2005 |
| JP | 58057050 | A | 4/1983 |
| JP | 62002149 | A | 1/1987 |

OTHER PUBLICATIONS

German Office Action, German Application No. 10 2006 058 880.0-26, 3 pages, Apr. 21, 2009.

International Search Report, PCT/EP2007/061779, 12 pages, Mar. 27, 2008.

* cited by examiner

METHOD FOR CALIBRATING A LAMBDA SENSOR AND INTERNAL COMBUSTION ENGINE

CROSS-REFERENCE TO RELATED APPLICATIONS

This application is a U.S. National Stage Application of International Application No. PCT/EP2007/061779 filed Oct. 31, 2007, which designates the United States of America, and claims priority to German Application No. 10 2006 058 880.0 filed Dec. 13, 2006, the contents of which are hereby incorporated by reference in their entirety.

TECHNICAL FIELD

The invention relates to a method for correcting an output signal of a lambda sensor of an internal combustion engine, and also an internal combustion engine which has a control device by means of which the method can be accomplished.

BACKGROUND

Due to ever tighter emission control values, emission control on internal combustion engines is of great importance. The use of exhaust control system catalytic converters is indispensable for the reduction of pollutant emissions both on spark-ignition engines and on diesel engines. In addition modern internal combustion engines have injection control systems which enable a precise control of the composition of the combustion mixture and thus guarantee the best possible pollution limitation. An essential component of the injection control system is the lambda sensor fitted in the exhaust-gas tract of the internal combustion engine. On diesel engines and on spark-ignition engines, with which stratified-charged operation and/or lean operation is possible, linear lambda sensors, which are also known as wideband lambda sensors, are used. The output signal of these lambda sensors is, however, subject to errors, for example due to contamination, ageing or amplification errors.

A possible method of compensating for these inaccuracies is, for example, disclosed in DE 198 42 425 A1. According to this, the lambda sensor is calibrated during a fuel cut-off overrun phase of the internal combustion engine while the internal combustion engine is rotating with the injection switched off. During this fuel cut-off overrun phase, the output value of the lambda sensor is compared with a predetermined reference value for pure air under standard conditions and a correction factor is determined from any deviation. However, this method cannot also compensate for all inaccuracies of the lambda sensor.

SUMMARY

According to various embodiments, a method and an internal combustion engine can be provided by means of which an increase in the accuracy of the output signal of the lambda sensor can be achieved.

According to an embodiment, a method for correcting an output signal of a lambda sensor of an internal combustion engine, may have the following steps: Detection of a fuel cut-off overrun phase of the internal combustion engine, Sensing of an exhaust gas composition by means of the lambda sensor during the fuel cut-off overrun phase, Sensing of a temperature which represents a measure of the intake air of the internal combustion engine, and Calibration of the lambda sensor based on the sensed temperature.

According to a further embodiment, the method may further comprise a correction value, which is based on the maximum possible deviation of the signal of the lambda sensor at maximum air humidity at the sensed temperature from a signal of the lambda sensor under predetermined reference conditions, for calibration of the lambda sensor. According to a further embodiment, the correction value additionally may be based on an average expected value for the air humidity of the ambient air at the geographical position of the internal combustion engine. According to a further embodiment, the temperature may be the ambient temperature of the internal combustion engine. According to a further embodiment, the temperature may be the temperature in an intake tract of the internal combustion engine.

According to another embodiment, an internal combustion engine may have a lambda sensor which is arranged in an exhaust gas tract of the internal combustion engine, a means for sensing a temperature which represents a measure of the intake air of the internal combustion engine, a control device, which is connected to the lambda sensor and to the means for sensing the temperature and is designed so that a fuel cut-off overrun phase of the internal combustion engine is detected, the composition of the exhaust gas of the internal combustion engine is detected during the fuel cut-off overrun phase by means of the lambda sensor, the temperature, which represents a measure of the intake air, is sensed and the lambda sensor is calibrated on the basis of the sensed temperature.

BRIEF DESCRIPTION OF THE DRAWINGS

In the following, an exemplary embodiment is explained in more detail with reference to the included drawings. The drawings are as follows:

FIG. 1A schematic representation of an internal combustion engine;

DETAILED DESCRIPTION

Figure 1:
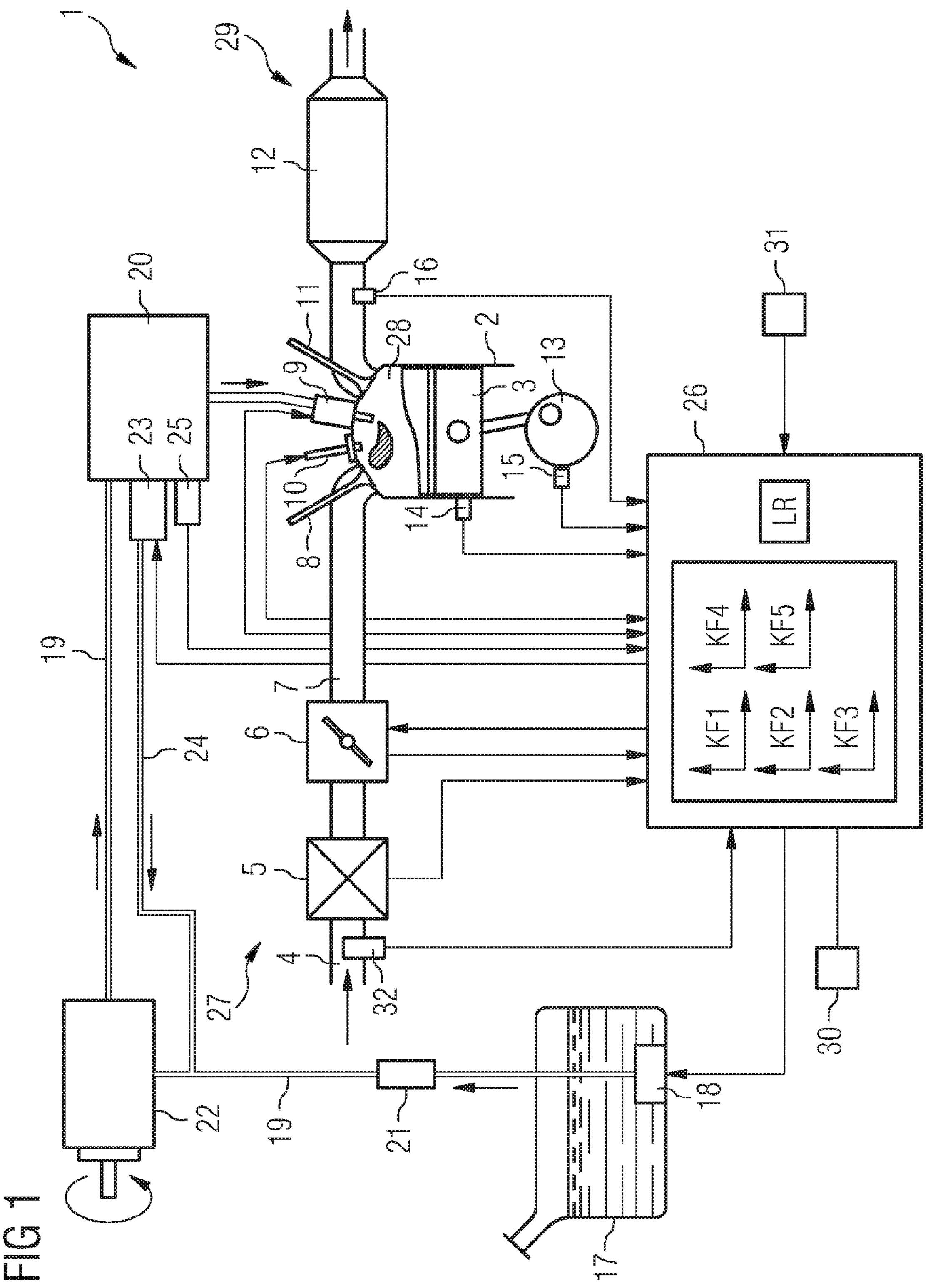
FIG. 1 shows a schematic of an internal combustion engine 1. For reasons of improved clarity, the representation is shown very simplified.

With a method for correcting an output signal of a lambda sensor of an internal combustion engine according to an embodiment, a fuel cut-off overrun phase of the internal combustion engine is first detected and the composition of the exhaust gas during the fuel cut-off overrun phase is then determined by means of the lambda sensor. Furthermore, the temperature is sensed which represents a measure of the intake air of the internal combustion engine. The lambda sensor is then calibrated on the basis of the sensed temperature. The various embodiments are based on the knowledge that fluctuations in the temperature of the intake air of the internal combustion engine unavoidably also lead to fluctuations in the output signal of the lambda sensor and thus to an inexact calibration of the lambda sensor, according to the known method, which does not take account of the temperature. An incorrect calibration of the lambda sensor during the fuel cut-off overrun phase without taking account of the temperature of the intake air or of the ambient air therefore unavoidably leads to a permanent measuring error of the lambda sensor in the further operation of the internal combustion engine, which hinders an optimum reduction in the pollutant emissions of the internal combustion engine. The idea on which the various embodiments are based can therefore be seen in that the influence of the temperature of the intake air or of the ambient air on the output signal of the lambda sensor is taken into account in the fuel cut-off overrun phase during the calibration. By using a standard measured value, which is usually present, for the temperature of the ambient air or of the intake air of the internal combustion engine, the method according to an embodiment therefore enables the lambda sensor to be calibrated with significantly greater accuracy, which finally has a positive effect on the emission behavior of the internal combustion engine.

In an embodiment of the method, a correction value is formed to calibrate the lambda sensor, with the correction value being based on the maximum possible deviation of the output value of the lambda sensor at maximum air humidity at the sensed temperature of a signal from the lambda sensor under predetermined reference conditions.

This embodiment of the method is based on the knowledge that a reason for the dependency of the output signal of the lambda sensor on the temperature is to be found in the influence of the air humidity on the oxygen concentration of the intake air. The greater the air humidity the lower the oxygen content of the air. This unavoidably leads to the lambda sensor delivering different output signals depending on the particular pertaining air humidity, during the fuel cut-off overrun phase, in which the cylinders and the exhaust-gas tract of the internal combustion engine are scavenged by ambient air. If the air humidity is known, errors caused by it can therefore be corrected, which, however, does require the use of an expensive air humidity sensor. Because of the close correlation between the maximum air humidity and the air temperature, the measured value for the temperature of the ambient air or of the intake air is, according to the embodiment of the method, used to reduce the influence of the air humidity on the output signal of the lambda sensor to a considerable degree without an air humidity sensor being required for this purpose. This is, for example, possible by means of suitable statistical methods, which are based on the maximum air humidity at the momentary prevailing temperature of the ambient air or of the intake air and the influence of air humidity on the output signal of the lambda sensor. The relationship between the maximum air humidity and the temperature and the relationship between the air humidity and the output value of the lambda sensor are known and can, for example, be stored in a memory of a control device of the internal combustion engine. Refer to the exemplary embodiment for further detailed information on the procedure.

In a further embodiment of the method the correction value is additionally based on an average expected value for the air humidity of the ambient air at the geographical position of the internal combustion engine.

This embodiment of the method enables a flexible and improved calibration of the lambda sensor signal depending on the geographical position of the internal combustion engine. The average expected value for the air humidity of the ambient air is, for example, provided by appropriate weather services and can be stored in the form of a table in a memory element of the control device. The momentary geographical position can be determined by means of a position determining system. According to further embodiments of the method, the temperature, which represents a measure of the intake air of the internal combustion engine, is the ambient temperature or the temperature which prevails in an intake tract of the internal combustion engine.

Both the value for ambient temperature and the value for the temperature in the intake tract of the internal combustion engine are available as standard in modern engine control systems and are provided either by sensors or suitable temperature models. Due to the close correlation, both values can be converted to each other by suitable models.

An internal combustion engine according to an embodiment includes a lambda sensor, which is arranged in an exhaust tract of the internal combustion engine, a means for sensing a temperature, which represents a measure for the intake air of the internal combustion engine, and a control device which is connected to the lambda sensor and the means for sensing the temperature. The control device is designed so that it can execute the method as described above.

For the advantages of the internal combustion engine, refer to the explanations of the method.

The internal combustion engine 1 includes at least one cylinder 2 and a piston 3 which can move up and down in the cylinder 2. The internal combustion engine 1 furthermore has an intake tract 27 in which an intake opening 4 for drawing in fresh air, an air mass sensor 5, a throttle valve 6 and an intake pipe 7 are arranged upstream. The intake tract 27 terminates in a combustion chamber 28 bounded by the cylinder 2 and the piston 3. The fresh air required for combustion is introduced into the combustion chamber 28 via the intake tract 27, with the fresh air supply being controlled by the opening and closing of an inlet valve 8. The internal combustion engine 1 shown here is an internal combustion engine 1 with direct fuel injection with which the fuel required for combustion is injected directly via an injection valve 9 into the combustion chamber 28. A spark plug 10, which also projects into the combustion chamber 28, serves to ignite the combustion. The combustion exhaust gases are drawn off via an exhaust valve 11 into an exhaust-gas tract 29 of the internal combustion engine 1 and cleaned by means of an exhaust gas catalytic converter 12 arranged in the exhaust-gas tract 29. The transfer of force to a drive train of a vehicle (not illustrated) takes place by means of a crankshaft 13 connected to the piston 3.

The internal combustion engine 1 also has a combustion chamber pressure sensor 14, a speed sensor 15 for sensing the speed of the crankshaft 13, a position determining device 30 for determining the geographical position of the internal combustion engine 1, a lambda sensor 16 which is arranged in the exhaust-gas tract 29 before the exhaust gas catalytic converter 12, a temperature sensor 31 for sensing the ambient temperature or, as an alternative to this, a temperature sensor 32 arranged in the intake tract 27 for sensing the intake air temperature.

The internal combustion engine 1 also has a fuel tank 17 and a fuel pump 18 arranged within the fuel tank 17. The fuel is fed by the fuel pump 18 via a supply line 19 to a pressure accumulator 20. In this case it is a common pressure accumulator 20 from which the injection valves 9 for several cylinders 2 are supplied with fuel under pressure. There is also a fuel filter 21 and a high-pressure pump 22 arranged in the supply pipe 19. The high-pressure pump 22 serves to supply the fuel delivered by the fuel pump 18 at relatively low pressure (approximately 3 bar) at high pressure to the pressure accumulator 20 (typically up to 150 bar). The high-pressure pump 22 in this case is driven by its own drive (not illustrated), for example an electric motor, or by suitable coupling to the crankshaft 13. To control the pressure in the pressure accumulator 20, a pressure adjusting means 23, for example a pressure control valve or a quantity control valve, is arranged at the pressure accumulator 20, which enables the fuel present in the pressure accumulator 20 to flow back via a return line 24 to the supply line 19 or to the fuel tank 17. Furthermore, a pressure sensor 25 is provided for monitoring the pressure in the pressure accumulator 20.

A control device 26 is allocated to the internal combustion engine 1 and is connected via signal and data lines to all the actuators and sensors. Map-based engine control functions (KF1 to KF5) and a lambda controller LR are implemented by software in the control device 26. The lambda controller LR is designed in such a way that it doses the amount of fuel supplied by the injection valves 9 on the basis of a measured value of the lambda sensor 16 so that the lambda value of the exhaust gas is set to a predetermined desired value. Based on the measured values of the sensors and the map-based engine control functions, control signals from the control device 26 are transmitted to the actuators of the internal combustion engine 1. The control device 26 is thus connected via the data and signal lines to the fuel pump 18, the pressure adjusting means 23, the pressure sensor 25, the air mass sensor 5, the throttle valve 6, the spark plug 10, the injection valve 9, the combustion chamber pressure sensor 14, the speed sensor 15, the lambda sensor 16, the position determining device 30, the temperature sensor 31 for the ambient air and the temperature sensor 32 for the intake air.

The lambda sensor 16 used in the exemplary example is a linear lambda sensor 16, which is also called a wideband lambda sensor 16. This delivers a clear and monotone increasing signal in a wide lambda range, typically λ=0.7 to λ=4. The output signal of the lambda sensor 16 is converted to a lambda value using a characteristic curve stored in the control device 26. The measured value of the lambda sensor 16 is supplied to the lambda controller LR implemented in the control device 26 and is compared with a lambda desired value. An adjustment of the lambda value to the lambda desired value then takes place via an injection quantity correction, i.e. a suitable matching of the amount of fuel to be injected. It is thus necessary, for example in the stoichiometric homogenous operation of a spark-ignition engine, to set the exhaust gas composition to a lambda value of λ=1.0 by means of the injection quantity control system, because the exhaust gas catalytic converter has optimum cleaning properties in only a narrow band around λ=1.0. Furthermore, for example with homogeneous lean operation of the internal combustion engine 1 it is necessary to keep the exhaust gas composition within a specific lean lambda range, in order to avoid the development of excessive $NO_x$. The same applies also for internal combustion engines 1 which can be operated in the stratified-charge mode, as it is called. It can therefore be easily seen that an exact measurement of the exhaust gas composition by the lambda sensor 16 is an essential precondition for reducing the pollutant emissions of the internal combustion engine 1 and thus complying with the emission limit values.

The measuring accuracy of the lambda sensor 16 does, however, suffer due to the influence of ageing and pollution and has a certain scatter because of component tolerances. Therefore, a shift in the characteristic curve for the lambda sensor 16, stored in the control device 26, takes place.

It is known that a correction or calibration of the lambda sensor 16 takes place in a fuel cut-off overrun phase of the internal combustion engine 1. Fuel cut-off overrun in this case is the operating condition of the internal combustion engine 1 during which the internal combustion engine 1 rotates with the fuel injection switched off. This causes ambient air to be drawn in via the intake tract 27 to the combustion chamber 28 of the internal combustion engine 1 and then pumped, largely unchanged, into the exhaust-gas tract 29 and thus to the lambda sensor 16. The cylinder 2, the exhaust-gas tract 29 and the exhaust gas catalytic converter 12 of the internal combustion engine 1 are therefore scavenged by ambient air during the fuel cut-off overrun phase. For calibration of the lambda sensor 16, it is assumed that the oxygen content of the ambient air has a known value of approximately 21% by volume. The ambient air is therefore used as a reference measurement gas for new calibration or for correction of the output signal of the lambda sensor 16. A nominal reference value of the lambda sensor 16 at a test gas of exactly 21% by volume of oxygen, predetermined by a manufacturer of the lambda sensor 16, is stored in the control device 26. A correction of the characteristic curve of the lambda sensor 16 can be carried out on the basis of the actual output value of the lambda sensor 16 during the fuel cut-off overrun phase and the predetermined reference value of the manufacturer. A further advantage of this method is that it can be performed at regular intervals over the complete service life. Such a method is known from DE 198 42 425 A1.

The oxygen concentration in the ambient air can, however, be assumed to be 21% by volume in an ideal case. The oxygen concentration of the ambient air is in fact actually subject to measurable fluctuations which unavoidably also affect the calibration of the lambda sensor 16 during the fuel cut-off overrun phase. An essential influencing factor for the oxygen concentration of the ambient air is the air humidity. The higher the air humidity the lower the oxygen concentration in the ambient air. This is explained further using Table 1 as an example (the values refer to a test sensor with an output signal of 6 mA under reference conditions):

TABLE 1

| Air temperature | [° C.] | −10 | 0 | 10 | 20 | 30 |
|---|---|---|---|---|---|---|
| Maximum possible absolute air humidity (at 100% relative air humidity) | [g/kg] | 1.75 | 3.76 | 7.58 | 14.50 | 26.40 |
| Resulting maximum possible deviation of the sensor signal during overrun compensation | [%] | −0.26 | −0.56 | −1.14 | −2.18 | −3.96 |

Table 1 shows the maximum possible absolute air humidity, for various temperatures of the ambient air, in each case at 100% relative air humidity and also the resulting maximum possible deviation of the output signal of the lambda sensor 16 during the fuel cut-off overrun phase. A clear dependency of the maximum possible absolute air humidity and of the maximum possible deviation of the output signal of the lambda sensor 16 from the temperature can be seen. Whereas at a temperature of −10° C. of the ambient air a maximum possible air humidity of 1.75 g/kg is possible and a resulting maximum possible deviation of the output signal of the sensor of −0.26% is possible, these values increase at a temperature of 30° C. to 26.4 g/kg air humidity and a maximum possible error of the lambda sensor 16 of −3.96%. Such measured values can, for example, be obtained from the manufacturer of the lambda sensor 16 or determined by a separate series of measurements.

The amount of the possible error during the calibration of the lambda sensor 16 during the fuel cut-off overrun phase due to the varying oxygen concentration of the ambient air can be reduced in that the nominal reference value supplied by the manufacturer of the lambda sensor 16 is corrected by means of a correction value determined by the temperature of the ambient air or the intake air.

An exact correction of the output signal of the lambda sensor 16 is, however, only possible with knowledge of the exact air humidity of the ambient air of the internal combustion engine 1. This, however, presumes the use of an expensive air humidity sensor.

Figure 2:
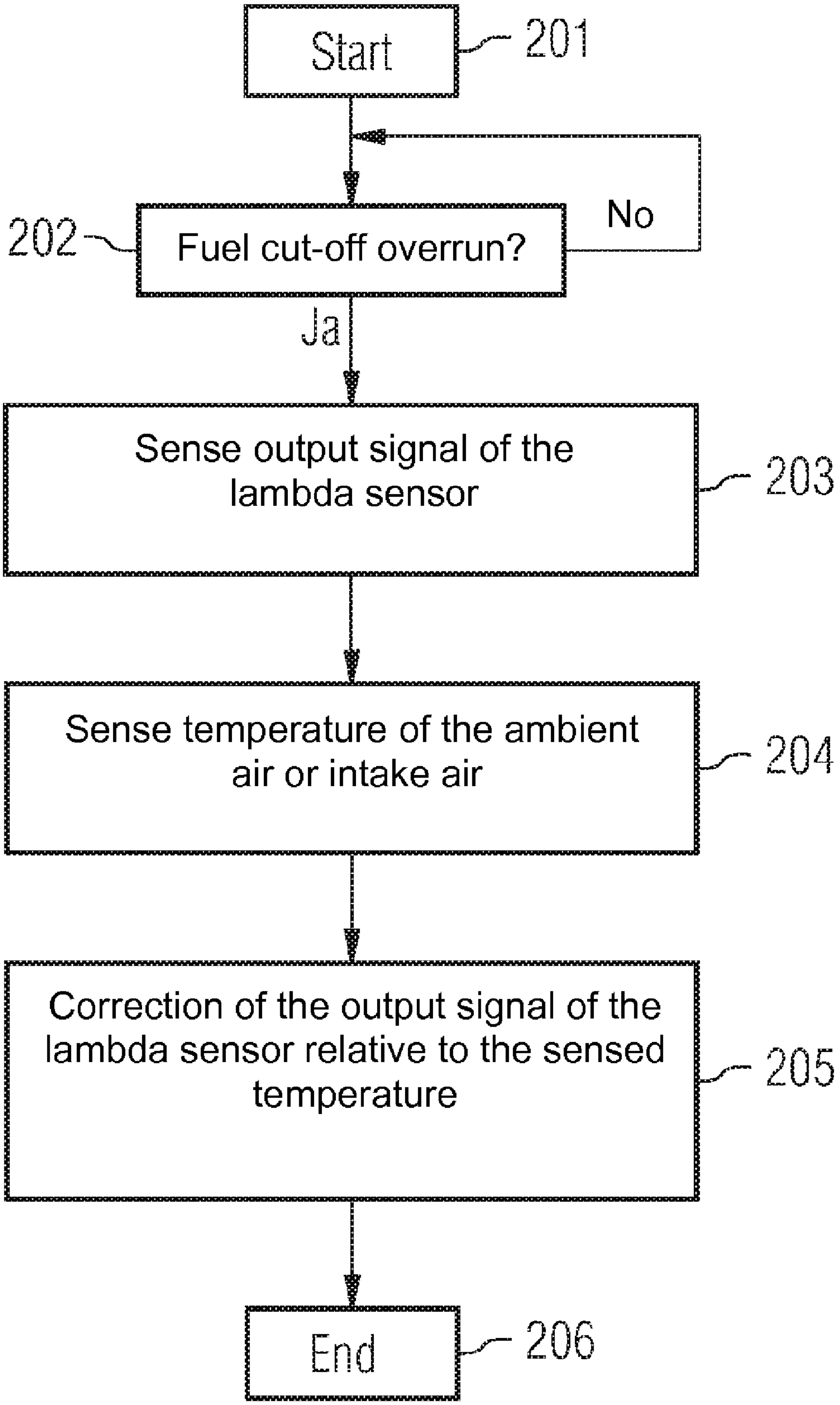
FIG. 2 An exemplary embodiment of the method in the form of a flow diagram.

An exemplary embodiment of a method for correcting the output signal of the lambda sensor 16 without providing an air humidity sensor is presented in the following. A flow diagram of the method is shown in FIG. 2. For example, two concrete variants of a statistical method for reducing the error during the calibration of the lambda sensor 16 in the fuel cut-off overrun phase are also shown.

After the start of the method in step 201, a check is first carried out in step 202 to determine whether the internal combustion engine 1 is in a fuel cut-off overrun phase. If a fuel cut-off overrun phase is detected, the sequence is continued with step 203. Otherwise, step 202 is repeated. In step 203, the output signal of the lambda sensor 16 is detected. In step 204 the temperature of the ambient air, or alternatively of the intake air, is now sensed. Based on the output signal of the lambda sensor 16 and the sensed temperature, the lambda sensor 16 is now recalibrated in step 205. Examples of two variants for a calibration of the lambda sensor 16 signal or for the calibration of the lambda sensor 16 are presented in the following.

With a first variant, the object is to reduce the maximum possible error of the output signal of the lambda sensor 16 due to the variable air humidity. This is achieved by the first variant in that the reference output value of the lambda sensor 16, supplied by the manufacturer of the lambda sensor 16, in air is corrected by 50% of the maximum possible deviation of the output signal at the measured temperature.

Table 2 shows the absolute correction value according to variant 1 relative to the temperature of the ambient air or the intake air, for example for a lambda sensor 16 with an output signal of 6 mA under reference conditions.

TABLE 2

| Air temperature | [° C.] | −10 | 0 | 10 | 20 | 30 |
|---|---|---|---|---|---|---|
| Absolute correction value (first variant) | [mA] | 0.008 | 0.017 | 0.034 | 0.065 | 0.119 |

Thus according to Table 1, at a temperature of 30° C. we get a maximum possible deviation of the sensor signal of −3.96%. Fifty percent of this maximum deviation is equal to −1.98%.

The absolute correction value according to variant 1, as shown in Table 2, at 30° C. therefore results in 1.98% of 6 mA, which corresponds to an absolute shift of 0.119 mA. The reference value for ambient air taken from the reference curve for the lambda sensor 16 is therefore corrected at a temperature of the ambient air or intake air of 30° C. by the value of 0.119 mA given in Table 2. The procedure is similar for other temperatures.

According to a second variant, the long-term average value of the amount of error of the output signal of the lambda sensor 16 is reduced. In this case, the reference value supplied by the manufacturer of the lambda sensor 16 is corrected by a reference value which is obtained from the statistical expected value for the air humidity at the actual geographical position of the internal combustion engine 1 at the measured temperature. To determine the correction value, knowledge of the expected average air humidity and the actual geographical position of the internal combustion engine 1 is required. Such data is provided by weather services and can, for example, be stored in the form of a map in the control device 26. The geographical position can in this case be determined by means of the position determining device (GPS).

Table 3 shows the absolute correction value, calculated in accordance with the second variant, relative to the temperature of the ambient air or intake air, for example for a lambda sensor 16 whose reference value for ambient air has been provided as 6 mA by the manufacturer.

TABLE 3

| Air temperature | [° C.] | −10 | 0 | 10 | 20 | 30 |
|---|---|---|---|---|---|---|
| Absolute correction value (second variant) | [mA] | 0.012 | 0.026 | 0.053 | 0.101 | 0.183 |

The calculation of the correction value according to the second variant is now explained as an example. It is assumed that the calibration of the lambda sensor 16 takes place at a temperature of the ambient air of 20° C. The maximum possible deviation of the output signal of the lambda sensor 16 at 20° C. is −2.18%, according to Table 1. The statistical expected value, obtained by evaluation of climatic data, for the average air humidity at the current position of the internal combustion engine 1 is, for example, assumed to be 77%. 77% of the maximum possible deviation of −2.18% amounts to 1.68%. The absolute correction value according to the second variant is 1.68% of the reference value of 6 mA. This results in a correction value of 0.101 mA. The reference value supplied by the manufacturer for the output value of the lambda sensor 16 in ambient air is therefore corrected by 0.101 mA at a temperature of 20° C. of the ambient air or intake air.

The exemplary embodiment of the method is again completely run through in step 206 and can either be ended here or restarted.

| | |
|---|---|
| 1 | Internal combustion engine |
| 2 | Cylinder |
| 3 | Piston |
| 4 | Intake opening |
| 5 | Air mass sensor |
| 6 | Throttle valve |
| 7 | Intake pipe |
| 8 | Inlet valve |
| 9 | Injection valve |
| 10 | Spark plug |
| 11 | Exhaust valve |
| 12 | Exhaust gas catalytic converter |
| 13 | Crankshaft |
| 14 | Combustion chamber pressure sensor |
| 15 | Speed sensor |
| 16 | Lambda sensor |
| 17 | Fuel tank |
| 18 | Fuel pump |
| 19 | Supply pipe |
| 20 | Pressure accumulator |
| 21 | Fuel filter |
| 22 | High-pressure pump |
| 23 | Pressure adjusting means |
| 24 | Return line |
| 25 | Pressure sensor |
| 26 | Control device |
| 27 | Intake tract |
| 28 | Combustion chamber |
| 29 | Exhaust-gas tract |
| 30 | Position determining device |
| 31 | Temperature sensor for ambient air |
| 32 | Temperature sensor for intake air |

What is claimed is:

1. A method for correcting an output signal of a lambda sensor of an internal combustion engine, comprising the following steps:

Detecting of a fuel cut-off overrun phase of the internal combustion engine,

Sensing of an exhaust gas composition by means of the lambda sensor during the fuel cut-off overrun phase, Sensing of a temperature which represents a measure of the intake air of the internal combustion engine, Calibrating of the lambda sensor based on the sensed temperature.

2. The method according to claim 1, comprising a correction value, which is based on the maximum possible deviation of the signal of the lambda sensor at maximum air humidity at the sensed temperature from a signal of the lambda sensor under predetermined reference conditions, for calibration of the lambda sensor.

3. The method claim 2, the correction value according to claim 2, wherein the correction value additionally being based on an average expected value for the air humidity of the ambient air at the geographical position of the internal combustion engine.

4. The method according to claim 1, wherein the temperature being the ambient temperature of the internal combustion engine.

5. The method according to claim 1, wherein the temperature being the temperature in an intake tract of the internal combustion engine.

6. An internal combustion engine comprising a lambda sensor which is arranged in an exhaust gas tract of the internal combustion engine, a means for sensing a temperature which represents a measure of the intake air of the internal combustion engine, a control device, which is connected to the lambda sensor and to the means for sensing the temperature and is designed so that a fuel cut-off overrun phase of the internal combustion engine is detected, the composition of the exhaust gas of the internal combustion engine is detected during the fuel cut-off overrun phase by means of the lambda sensor, the temperature, which represents a measure of the intake air, is sensed and the lambda sensor is calibrated on the basis of the sensed temperature.

7. The internal combustion engine according to claim 6, comprising a correction value, which is based on the maximum possible deviation of the signal of the lambda sensor at maximum air humidity at the sensed temperature from a signal of the lambda sensor under predetermined reference conditions, for calibration of the lambda sensor.

8. The internal combustion engine according to claim 7, wherein the correction value additionally being based on an average expected value for the air humidity of the ambient air at the geographical position of the internal combustion engine.

9. The internal combustion engine according to claim 6, wherein the temperature being the ambient temperature of the internal combustion engine.

10. The internal combustion engine according to claim 6, wherein the temperature being the temperature in an intake tract of the internal combustion engine.

11. A system for correcting an output signal of a lambda sensor of an internal combustion engine, comprising:

Means for detecting of a fuel cut-off overrun phase of the internal combustion engine, a lambda sensor for sensing of an exhaust gas composition during the fuel cut-off overrun phase, Means for sensing of a temperature which represents a measure of the intake air of the internal combustion engine, Means for calibration of the lambda sensor based on the sensed temperature.

12. The system as claimed in claim 11, with a correction value, which is based on the maximum possible deviation of the signal of the lambda sensor at maximum air humidity at the sensed temperature from a signal of the lambda sensor under predetermined reference conditions, for calibration of the lambda sensor.

13. The system as claimed in claim 12, with the correction value additionally being based on an average expected value for the air humidity of the ambient air at the geographical position of the internal combustion engine.

14. The system as claimed in claim 11, with the temperature being the ambient temperature of the internal combustion engine.

15. The system as claimed in claim 11, with the temperature being the temperature in an intake tract of the internal combustion engine.

* * * * *